US008154856B2

(12) United States Patent
Fontana et al.

(10) Patent No.: US 8,154,856 B2
(45) Date of Patent: Apr. 10, 2012

(54) CABINET FOR A POWER DISTRIBUTION SYSTEM

(75) Inventors: Edward C. Fontana, Rockwall, TX (US); Paul Smith, Denton, TX (US); William C. England, II, Royse City, TX (US)

(73) Assignee: Lineage Power Corporation, Plano, TX (US)

( * ) Notice: Subject to any disclaimer, the term of this patent is extended or adjusted under 35 U.S.C. 154(b) by 119 days.

(21) Appl. No.: 12/775,882

(22) Filed: May 7, 2010

(65) Prior Publication Data

US 2011/0141664 A1 Jun. 16, 2011

Related U.S. Application Data

(60) Provisional application No. 61/308,215, filed on Feb. 25, 2010, provisional application No. 61/287,322, filed on Dec. 17, 2009, provisional application No. 61/287,057, filed on Dec. 16, 2009.

(51) Int. Cl.
H02B 1/26 (2006.01)

(52) U.S. Cl. ...... 361/624; 361/622; 361/625; 312/223.1
(58) Field of Classification Search ............ 361/601, 361/622, 624–625; 312/223.1
See application file for complete search history.

(56) References Cited

U.S. PATENT DOCUMENTS

| | | | | |
|---|---|---|---|---|
| 5,238,431 A * | 8/1993 | Kreisinger | ........... | 439/733.1 |
| 5,346,413 A * | 9/1994 | Leon et al. | ........... | 439/733.1 |
| 5,403,679 A * | 4/1995 | Stone | ........... | 429/99 |
| 6,357,590 B1 * | 3/2002 | Karpisek | ........... | 206/386 |
| 6,560,131 B1 * | 5/2003 | vonBrethorst | ........... | 363/146 |
| 6,657,123 B2 * | 12/2003 | Moore | ........... | 174/50 |
| 7,688,578 B2 * | 3/2010 | Mann et al. | ........... | 361/679.46 |
| 7,808,775 B2 * | 10/2010 | Cherney et al. | ........... | 361/624 |
| 7,925,746 B1 * | 4/2011 | Melton | ........... | 709/224 |

* cited by examiner

Primary Examiner — Robert J Hoffberg

(57) ABSTRACT

A power distribution system comprising a cabinet configured to hold electronic components therein. An outside surface of the cabinet has one or more electrical termination contacts thereon such that a surface of the electrical termination contacts is part of the outside surface. The electrical termination contacts are configured to be coupled to an external DC power source at the outside surface.

11 Claims, 6 Drawing Sheets

CABINET FOR A POWER DISTRIBUTION SYSTEM

CROSS-REFERENCE TO RELATED APPLICATIONS

This application claims the benefit of U.S. Provisional Application Ser. No. 61/308,215, filed on Feb. 25, 2010, to Edward C. Fontana, et al. entitled, "POWER DISTRIBUTION PLATFORM;" Provisional Application Ser. No. 61/287,322, filed on Dec. 17, 2009, to Roy Davis, et al. entitled, "HYBRID ARCHITECTURE FOR DC POWER PLANTS;" and Provisional Application Ser. No. 61/287,057, to filed on Dec. 16, 2009 to Edward C. Fontana, et al. entitled, "A FLOOR MOUNTED DC POWER DISTRIBUTION SYSTEM," which are all commonly assigned with this application and incorporated herein by reference in their entirety.

TECHNICAL FIELD

This application is directed, in general, to a power distribution system and, more specifically, to an electronic cabinet of the system and method of installing the power distribution system having such a cabinet.

BACKGROUND

This section introduces aspects that may be helpful to facilitating a better understanding of the inventions. Accordingly, the statements of this section are to be read in this light. The statements of this section are not to be understood as admissions about what is in the prior art or what is not in the prior art.

Telecommunication sites are evolving into large data centers, making extensive use of many similar configurations of server equipment. The Green Grid consortium has suggested that 48 VDC is the most efficient and cost effective way to power such equipment, and, provide the highest availability and reliability of reserve power in case of utility grid failure. Present DC distribution and installation practices, however, can be time consuming, have high labor costs, and require large amounts of copper cabling with its associated overhead support structures, thereby further increasing the costs of such installations.

There is a long-felt need to more efficiently install and distribute DC power to server equipment at reduced labor and material costs.

SUMMARY

One embodiment provides a power distribution system. The system comprises a cabinet configured to hold electronic components therein. An outside surface of the cabinet has one or more electrical termination contacts thereon such that a surface of the electrical termination contacts is part of the outside surface. The electrical termination contacts are configured to be coupled to an external DC power source at the outside surface.

Another embodiment provides a method of assembling the above-described power distribution system. The method comprises positioning the cabinet in a target location and coupling the electrical termination contacts to the external DC power source.

BRIEF DESCRIPTION OF DRAWINGS

Embodiments of the disclosure are better understood from the following detailed description, when read with the accompanying FIGS. Corresponding or like numbers or characters indicate corresponding or like structures. Various features may not be drawn to scale and may be arbitrarily increased or reduced in size for clarity of discussion. Reference is now made to the following descriptions taken in conjunction with the accompanying drawings, in which.

DETAILED DESCRIPTION

The following merely illustrate principles of the invention. Those skilled in the art will appreciate the ability to devise various arrangements which, although not explicitly described or shown herein, embody the principles of the invention and are included within its scope. Furthermore, all examples and conditional language recited herein are principally intended expressly to be only for pedagogical purposes to aid in understanding the principles of the invention and the concepts contributed by the inventor(s) to furthering the art, and are to be construed as being without limitation to specifically disclosed embodiments and conditions. Moreover, all statements herein reciting principles, aspects, and embodiments of the invention, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Figure 1:
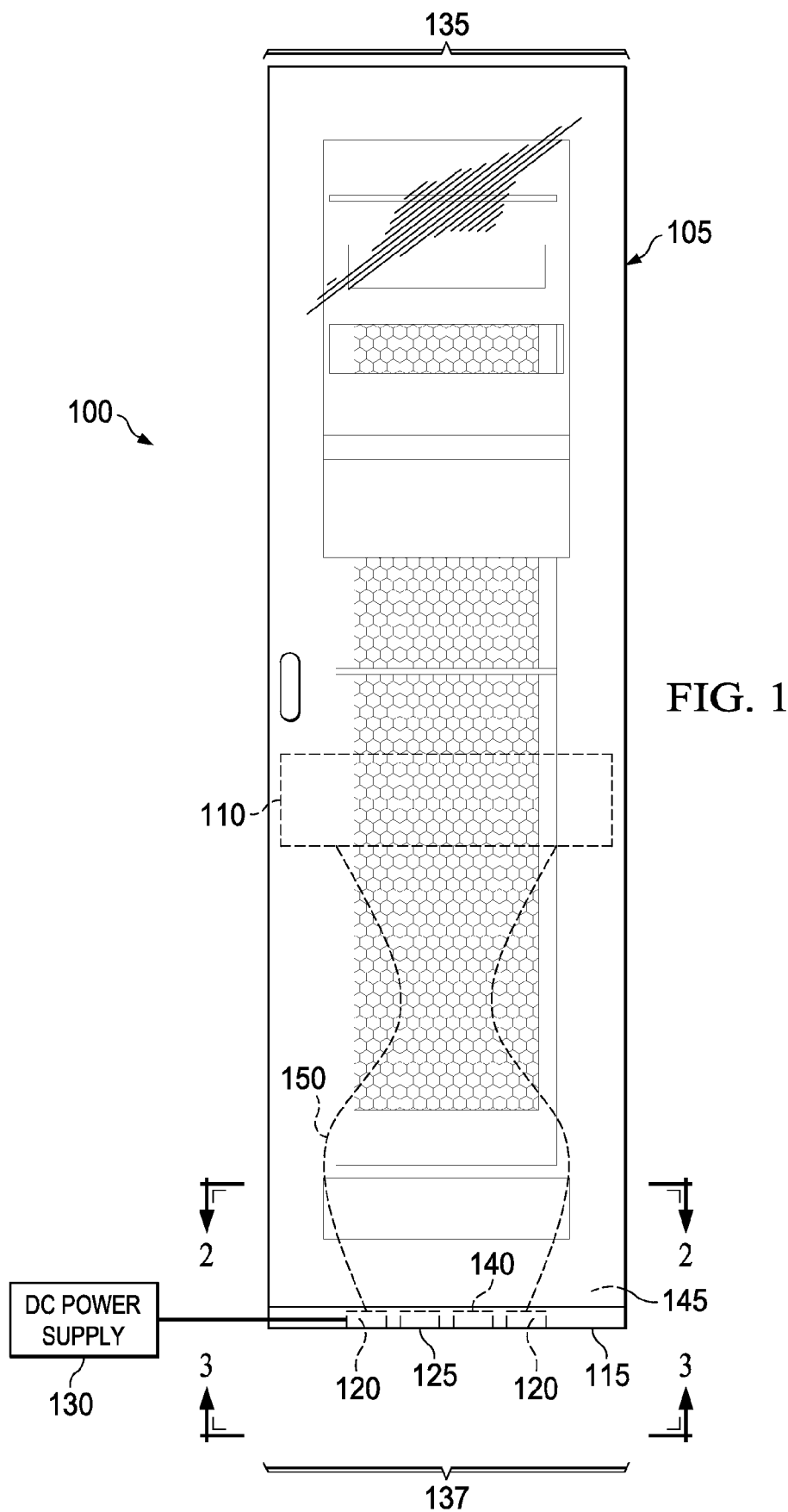
FIG. 1 shows a front view of an example embodiment of a power distribution system of the disclosure.
Figure 3:
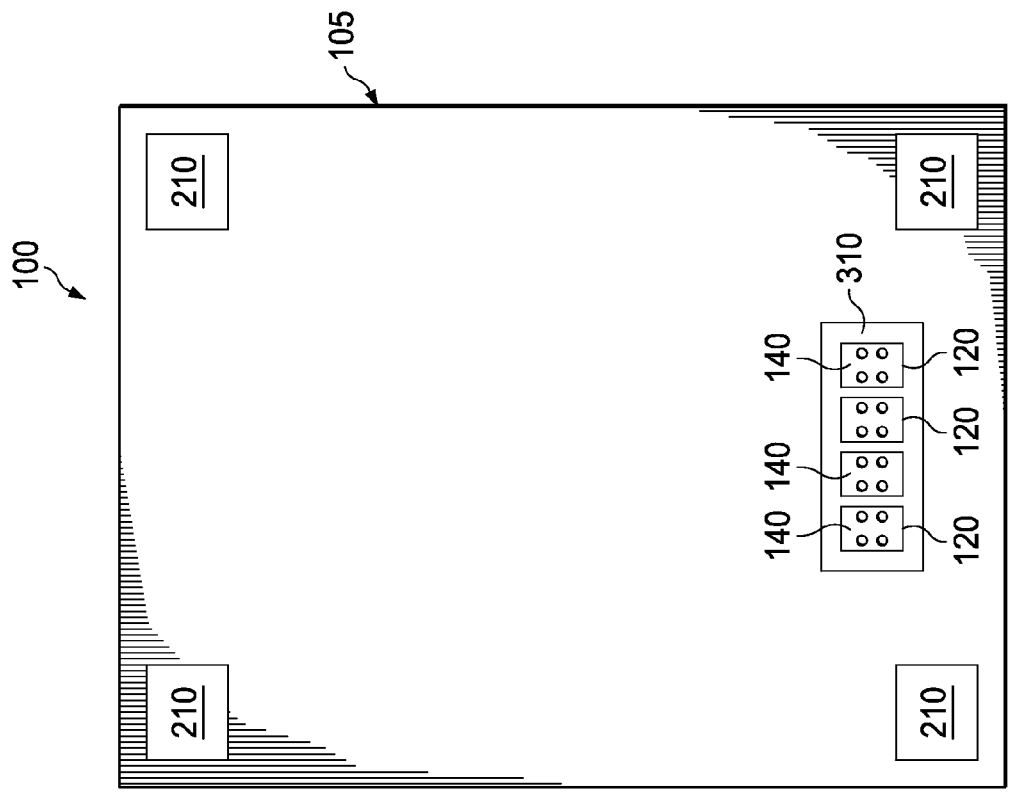
FIG. 3 shows another plan view of the power distribution system corresponding to view line 3-3 in FIG. 1.
Figure 2:
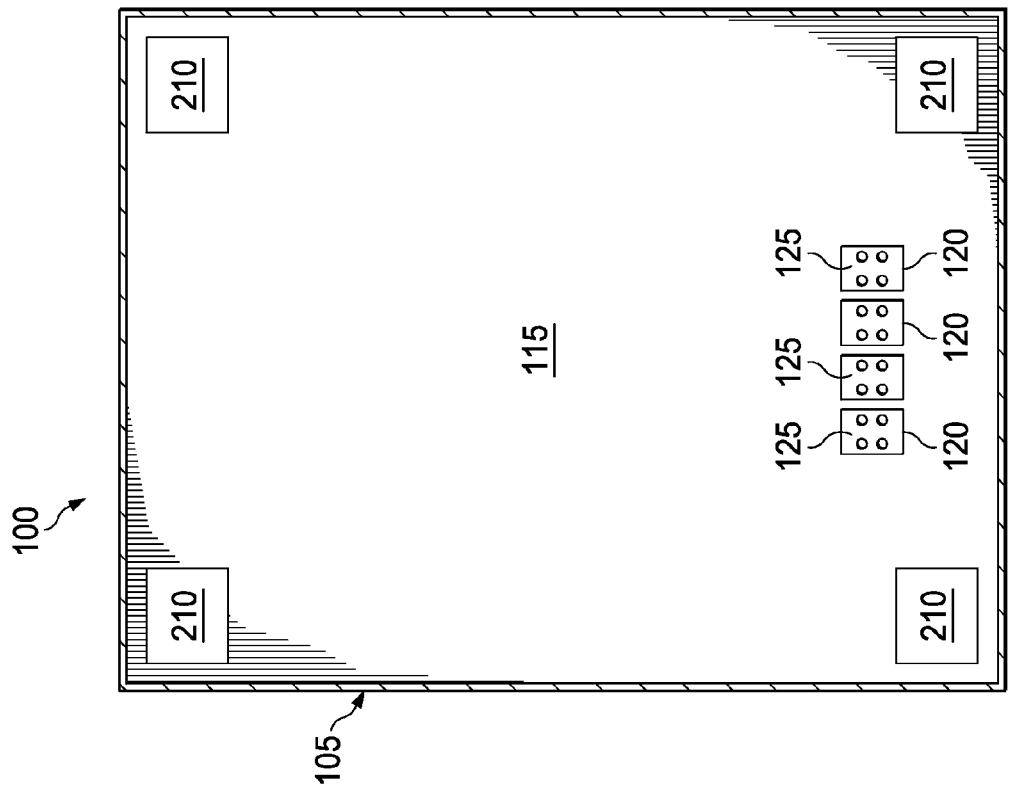
FIG. 2 shows a plan view of the example power distribution system of FIG. 1 through view line 2-2 in FIG. 1.

One embodiment is a power distribution system. FIG. 1 shows a front view of an example embodiment of the power distribution system 100 featuring a cabinet of the disclosure. FIG. 2 shows a plan view of the power distribution system 100 through view line 2-2 in FIG. 1. FIG. 3 shows another plan view of the power distribution system 100 corresponding to view line 3-3 in FIG. 1.

The example power distribution system 100 comprises a cabinet 105 configured to hold electronic components 110 (e.g., telecommunication server equipment) therein, an outside surface 115 of the cabinet having one or more electrical termination contacts 120 thereon such that a surface 125 of the electrical termination contacts 120 is part of the outside surface 115, the electrical termination contacts 120 configured to be coupled to an external DC power source 130 at the outside surface 115.

In some embodiments, to facilitate having a compact cabinet design, the outside surface 115 having the one or more electrical termination contacts 120 is located at one of a top end 135 or a bottom end 137 of the cabinet 105. For instance, as shown in FIG. 1, the outside surface 115 is located at the bottom end 137.

In some embodiments, the surface 125 of the electrical termination contacts 120 is flush with the outside surface 115. Having such a flush surface 125 can help to prevent damage to the contacts 120 during shipping or installation of the cabinet 105.

In some preferred embodiments, the electrical termination contacts 120 are configured to carry a high current load, e.g., about 80 Amp or greater, and in some cases, about 800 Amp.

As also illustrated in FIG. 1, a second opposite surface 140 of the electrical termination contacts 120 faces an interior space 145 of the cabinet 105.

As further illustrated in FIG. 1, the cabinet 105 can include electrical feed connections 150 held in the interior space 145 of the cabinet 105. The electrical feed connections 150 are configured to be coupled to the electrical termination contacts 120 and to electronic components 110 held in the cabinet 105. For instance, the electrical feed connections 150 can be connected to the second opposite surface 140 on the electrical termination contacts 120 that faces the interior space 145. Non-limiting example electrical feed connections 150 include wires, cables, bars, or, combinations thereof.

In some cases as shown in FIG. 2, the cabinet can include hold-down structures 210 located at the end 137 of the cabinet 105 and configured to anchor the cabinet 105 to a floor that the cabinet 105 is mounted on.

In some cases as shown in FIG. 3, the cabinet 105 can include removable inserts 310 that cover the second opposite surface 140 having the electrical termination contacts 120. For instance, the removable inserts can be cardboard shipping inserts that protect the contacts from accumulating dirt, e.g., during transportation to an installation site, and protect against shipping damage.

Figure 4:
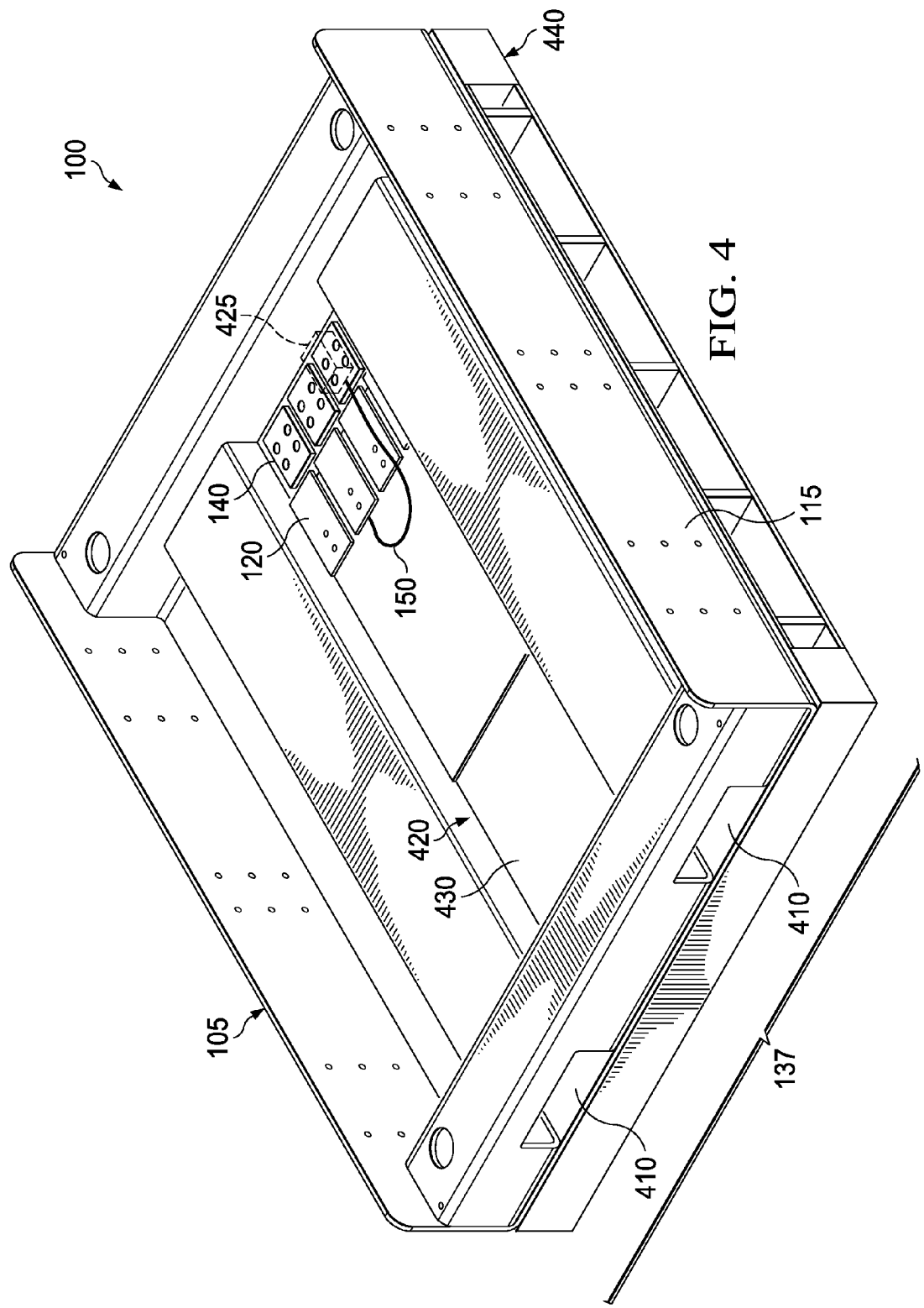
FIG. 4 presents a perspective view of another example embodiment of a power distribution system of the disclosure.

FIG. 4 shows a perspective view of another embodiment of the cabinet 105 of the system 100 that further includes recessed openings 410. For instance, an end (e.g., a top end 135 or a bottom end 137) of the cabinet 105 can have one or more recessed openings 410 configured to accommodate lifting structures therein. For instance, in some embodiments the recessed openings (e.g., a pair of openings) are configured to accommodate lifting structures that include fork-lift prongs.

As further illustrated in FIG. 4, in some embodiments, the recessed openings 410 can also define an interior cavity 420 on an interior surface 430 of the end (e.g., bottom end 137 in FIG. 4) of the cabinet 105. The presence of the termination contacts 120 in the interior cavity 420 can help protect the contacts 120 from damage during shipping. In some cases, the interior cavity 420 is configured to hold electrical feed connections 150 of the cabinet 105 therein. For instance, all or a portion of the electrical feed connections 150 can be held in the cavity 420 to protect the connections 150 during shipping or after the installation is complete. For instance, the electrical feed connections 150 can be coupled to electrical termination contacts 120 that are in, or partially in, the interior cavity 420 and configured to be coupled to electronic components 110 installed in the cabinet 105.

In other cases the interior cavity 420 may hold a frame filter 425 configured to separate electrical noise from the equipment in the cabinet 105 and the electrical feed 150. In the embodiment shown in FIG. 4, for example, the input of the frame filter 425 may directly connect to the termination contacts 120 and its output can connect to the electrical feed connections 150. The cabinet 105 can be furnished with one or more the frame filters 420 installed during manufacture with the electrical feed connections 150 in, or partially in, the interior cavity 420.

Figure 5:
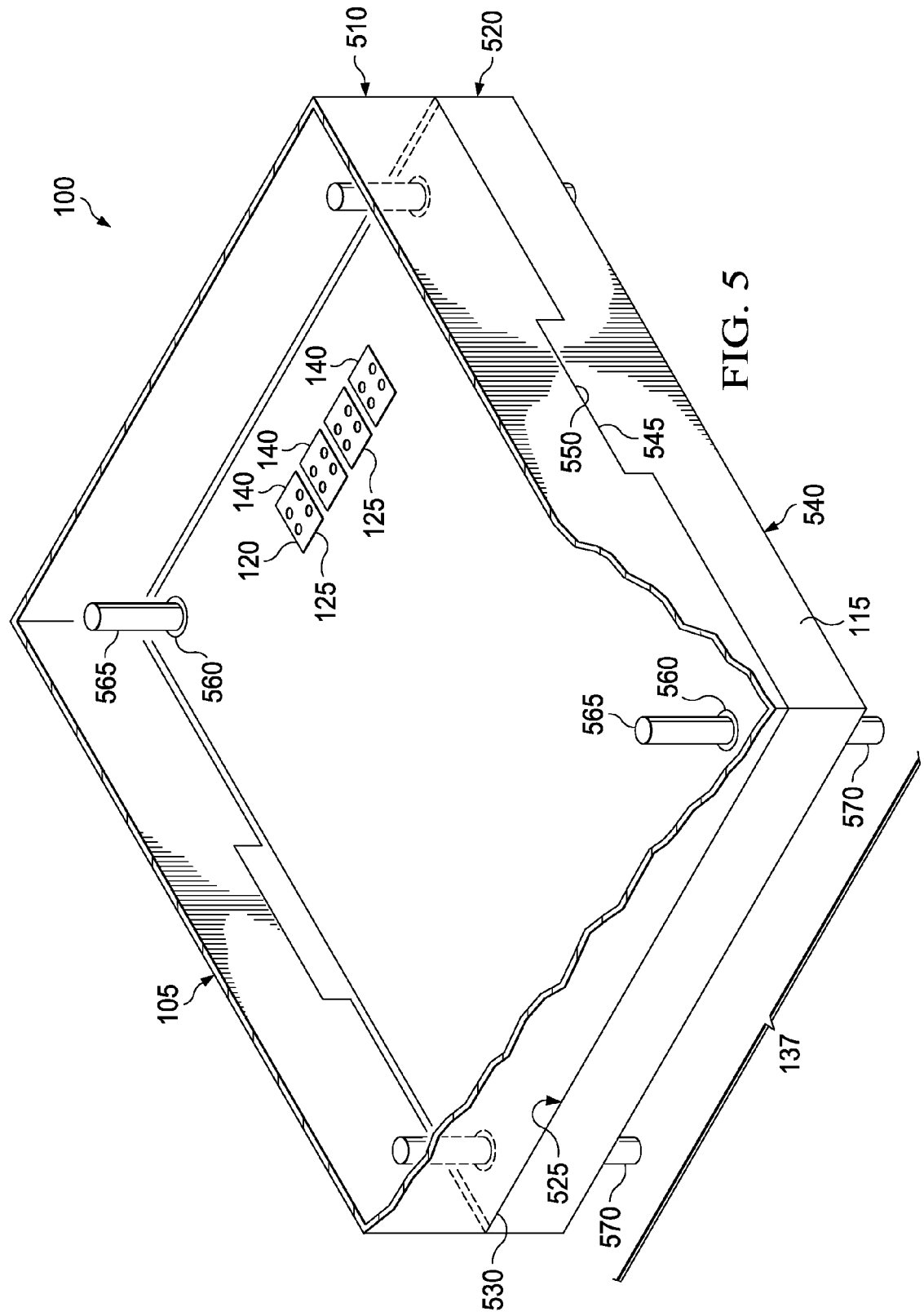
FIG. 5 presents a perspective view of still another example embodiment of a power distribution system of the disclosure.

FIG. 5 shows a perspective view of another embodiment of the cabinet 105 of the system 100 that further includes a legacy cabinet 510 coupled to an interposer body 520. The legacy cabinet 510 can be any present, or past, commercially available electrical cabinet, which unlike the cabinet embodiments depicted in FIGS. 1-4, do not have electrical termination contacts that are part of their outside surface. One end 525 of the interposer body 520 is configured to fit an end 530 of the legacy cabinet. In such embodiments, the outside surface 115 of the cabinet 100 having the electrical termination contacts 120 thereon is located on an opposite end 540 of the interposer body 520.

For instance, the opposite end 540 of the interposer body 520 can also have the surface 125 of the electrical termination contacts 120 as part of the outside surface 115 of the interposer body 520. Additionally, similar to other embodiments such as discussed in the context of FIGS. 1-4, the termination contacts 120 can be configured to be coupled to the external DC power source 130, and can be connected to the electrical feed connections 150.

In some embodiments, to facilitate stable coupling between the legacy cabinet 510 and interposer body 520, the one end 525 of the interposer body 520 can have an exterior surface profile 545 that conforms to an exterior surface profile 550 of the end 530 of the legacy electrical cabinet 510. For instance, in some cases, the interposer body's end exterior surface profile 545 can conform to the legacy cabinet's end exterior surface profile 550.

In some cases, the one end 525 of the interposer body 520 can be configured to fit one of a top end or a bottom end of the legacy cabinet 510 (e.g., bottom end 530 in FIG. 5). In some cases, the opposite end 540 of the interposer body 520 can have one or more recessed openings configured to accommodate lifting structures therein, similar to the openings 410 depicted in FIG. 4. For instance, in some cases the recessed openings of the interposer body 520 can define an interior cavity adapted to hold the electrical feed connections 150 therein, similar to the cavity 420 depicted in FIG. 4.

In some cases, the interposer body 520 further includes attachment structures 560 configured to accept hold-down structures 565 located at the end 530 of the legacy cabinet 510. The interposer body 520, in turn, can have its own hold-down structures 570 configured to anchor the body 520 to a floor, or other structure, that the body 520 is mounted on.

Figure 6:
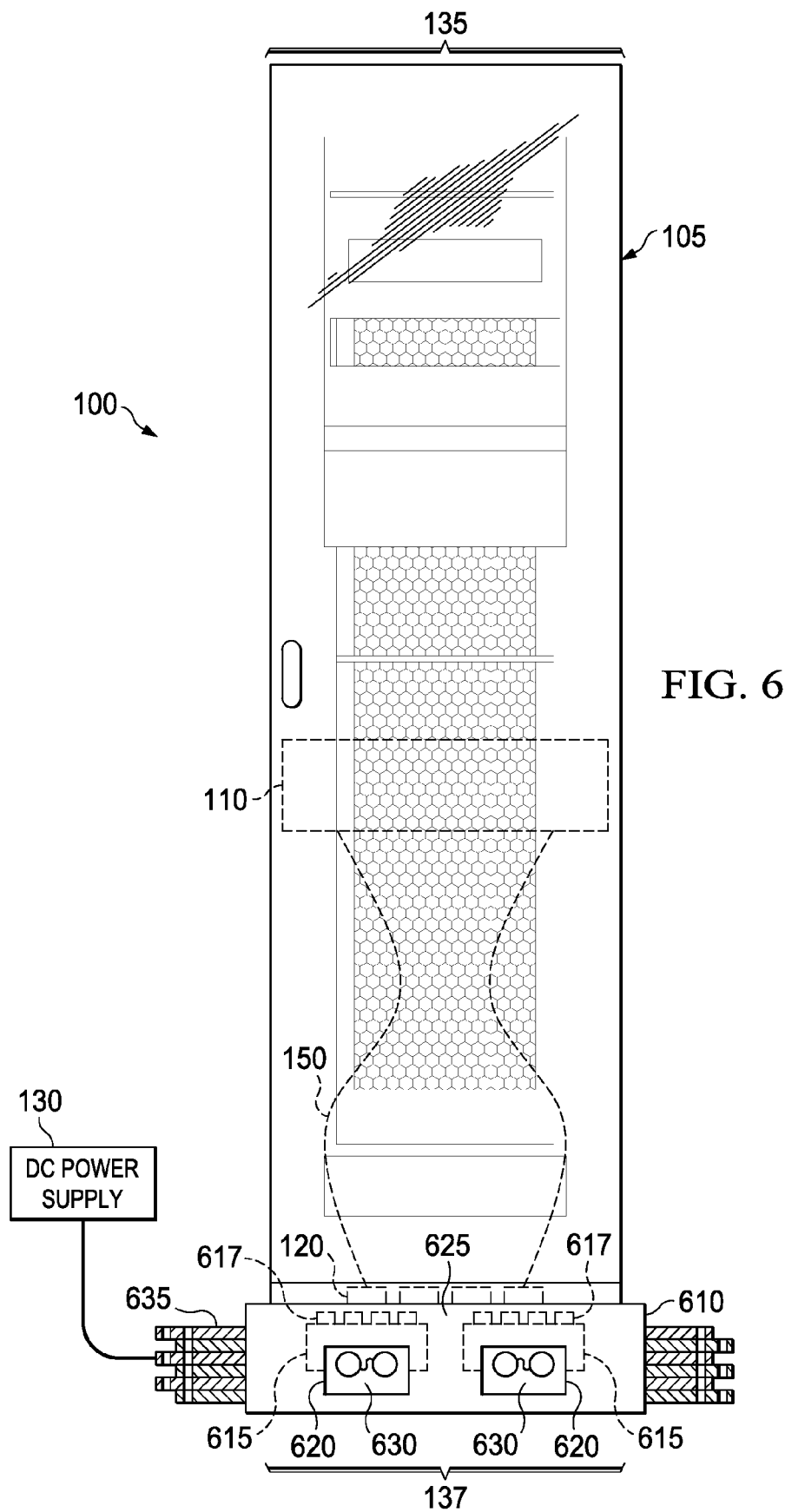
FIG. 6 presents a front view of another example embodiment of a power distribution system of the disclosure.

FIG. 6 shows a front view of another embodiment of the cabinet 105 of the system 100 that further includes a power distribution platform 610 that is configured to deliver DC power to the cabinet 105 from the DC power source 130. The platform 610 can be configured to rest on a top end, or support the bottom end of the cabinet 105 (e.g., bottom end 137 as shown in FIG. 6) of the cabinet 105 (including in some cases embodiments having the interposer body 510 depicted in FIG. 5). FIG. 4 also depicts another example platform 440 configured to support the cabinet 105.

As further illustrated in FIG. 6, embodiments of the platform 610 can include electrical connections 615 each with cabinet connection contacts 617, and one or more receptacles 620 in an outer surface 625 of the platform 610. The cabinet connection contacts 617 can be connected to electrical termination contacts 120 of the cabinet 105 to thereby couple the DC power source 130 to the electrical termination contacts 120 of the cabinet 105. For instance, each receptacle 620 can be configured to hold one or more electrical over-current protection devices 630 (e.g., fuses or circuit-breaker) which, when plugged into the receptacles 620, route DC power to the cabinet connection contacts 617 and on to the termination contacts 120. In some cases, the platform 610 can include a stack of bus bars 635 that are coupled to the DC power source 130 and the over-current protection devices 630.

The cabinet 105 can be adapted to be used with other embodiments of the platform 610, bus bars 635 (including bus bar stacks), and other components, such as discussed in the above-identified provisional patent applications, as well as the following non-provisional patent applications: U.S. patent application Ser. No. 12/775,796 to Edward Fontana, Paul Smith and William England entitled, "A platform for a power distribution system"; U.S. patent application Ser. No. 12/775,846 to Edward Fontana, Paul Smith, Richard Hock and William England entitled, "Stack of bus bars for a power distribution system"; U.S. patent application Ser. No. 12/775,915 to Edward Fontana, entitled, "A cabinet for a high current power distribution system"; U.S. patent application Ser. No. 12/775,954 to Edward Fontana and Paul Smith entitled, "Thermal extension structures for monitoring bus bar terminations," all of which are incorporated herein in their entirety.

Another embodiment of the disclosure is a method of assembling the power distribution system. For example, the assembly can be performed at an installation site of the system 100. The method can be used to assemble any of the power distribution systems 100 discussed in the context of FIGS. 1-6 herein.

Figure 7:
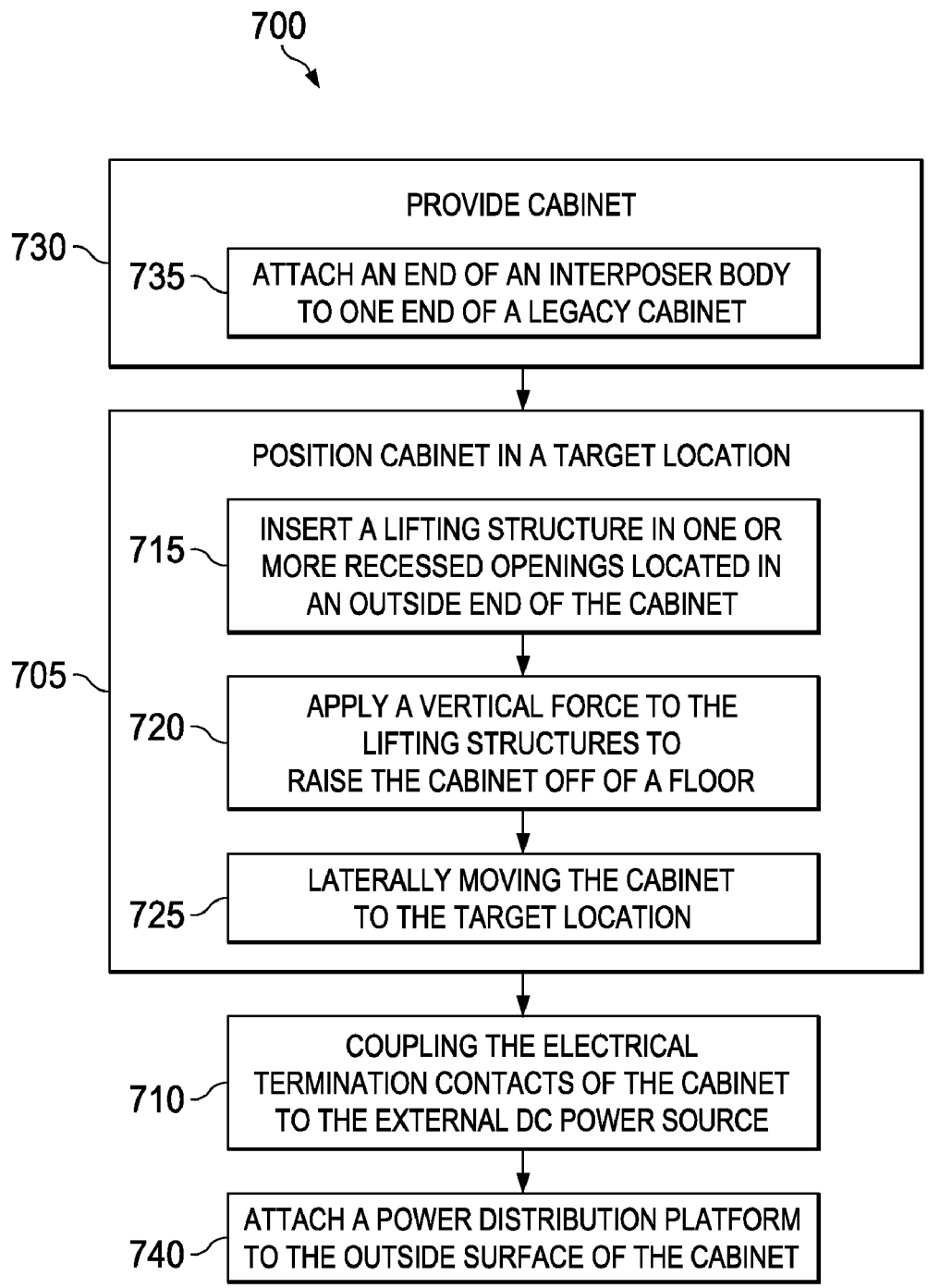
FIG. 7 presents a flow diagram of an example embodiment of a method of assembling a power distribution system of the disclosure, such as any of the example systems depicted in FIGS. 1-6.

FIG. 7 presents a flow diagram of an example embodiment of selected steps in the method 700 of assembling the power distribution system. With continuing reference to FIGS. 1-6, the method 700 comprises a step 705 of positioning the cabinet 105 in a target location, such as an installation site. The method 700 also comprises a step 710 coupling the electrical termination contacts 120 of the cabinet 105 to the external DC power source 130.

In some cases, positioning the cabinet 105 in step 705 further includes a step 715 of inserting a lifting structure in one or more recessed openings 410 located in an outside end 137 of the cabinet 105. The positioning the cabinet 105 in step 705 can also include a step 720 of applying a vertical force to the lifting structures to raise the cabinet 105 off of a floor, a step 725 laterally moving the cabinet 105 to the target location, and a step 730 of lowering the cabinet 105 to rest at the target location.

Some embodiments of the method 700 can further include a step 735 of providing the cabinet 105. For instance providing the cabinet in step 735 includes attaching an end 525 of an interposer body 520 to one end 530 of a legacy cabinet 510.

Some embodiments of the method 700 can further include a step 740 of including attaching a power distribution platform to the outside surface 125 of the cabinet 105.

One skilled in the art would understand that additional steps could be performed to complete the system's 100 installation. Examples of such additional steps are provided in the provisional and non-provisional patent applications cited elsewhere herein and incorporated by reference in their entirety.

Although the embodiments have been described in detail, those of ordinary skill in the art should understand that they could make various changes, substitutions and alterations herein without departing from the scope of the disclosure.

What is claimed is:

1. A power distribution system, comprising:
a cabinet having an interior space configured to hold electronic components therein, one or more electrical termination contacts defined in a wall of an end of the cabinet, an outside surface of the end of the cabinet having the one or more electrical termination contacts thereon such that a first surface of the electrical termination contacts is part of the outside surface, the first surface of the one or more electrical termination contacts configured to be coupled to an external DC power source at the outside surface;
a side of the cabinet adjacent to the end has two or more recessed openings configured to accommodate lifting structures therein;
an interior cavity is defined between the two or more recessed openings adjacent to the end of the cabinet; and
electrical feed connections disposed within the interior cavity of the cabinet, the electrical feed connections coupled to a second surface of the one or more electrical termination contacts, the second surface facing the interior space of the cabinet and being opposite to the first surface, the second surface of the one or more electrical termination contacts configured to be coupled to the electronic components installed in the interior space of the cabinet.

2. The power distribution system of claim 1, wherein the end is located at one of a top end or a bottom end of the cabinet.

3. The power distribution system of claim 1, wherein the first surface of the one or more electrical termination contacts is flush with the outside surface of the cabinet.

4. The power distribution system of claim 1, wherein the one or more electrical termination contacts are configured to carry a high current load.

5. The power distribution system of claim 1, further including removable inserts that cover the second surface of the one or more electrical termination contacts.

6. The power distribution system of claim 1, wherein the two or more recessed openings are configured to accommodate the lifting structures that include fork-lift prongs.

7. The power distribution system of claim 1, further including a power distribution platform configured to deliver DC power to the cabinet from the DC power source.

8. A method of assembling a power distribution system, comprising:
providing a cabinet having an interior space configured to hold electronic components therein, one or more electrical termination contacts defined in a wall of an end of the cabinet, an outside surface of the end of the cabinet having the one or more electrical termination contacts thereon such that a first surface of the electrical termination contacts is part of the outside surface, the first surface of the one or more electrical termination contacts configured to be coupled to an external DC power source at the outside surface, wherein:
a side of the cabinet adjacent to the end has two or more recessed openings configured to accommodate lifting structures therein;
an interior cavity is defined between the two or more recessed openings adjacent to the end of the cabinet; and
providing electrical feed connections disposed within the interior cavity of the cabinet, the electrical feed connections coupled to a second surface of the one or more electrical termination contacts, the second surface facing the interior space of the cabinet and being opposite to the first surface, the second surface of the one or more electrical termination contacts configured to be coupled to the electronic components installed in the interior space of the cabinet.

9. The method of claim 8, further including positioning the cabinet in a target location.

10. The method of claim 9, wherein positioning the cabinet further includes:
inserting a lifting structure in the two or more recessed openings located in the side of the cabinet; and
applying a vertical force to the lifting structures to raise the cabinet off of a floor.

11. The method of claim 8, further including coupling the electrical termination contacts to the external DC power source.

* * * * *